(12) United States Patent
Ma et al.

(10) Patent No.: US 11,099,734 B2
(45) Date of Patent: Aug. 24, 2021

(54) METHOD, APPARATUS AND COMPUTER PROGRAM PRODUCT FOR MANAGING STORAGE SYSTEM

(71) Applicant: EMC IP Holding Company LLC, Hopkinton, MA (US)

(72) Inventors: Chun Ma, Beijing (CN); Changyu Feng, Beijing (CN); Jian Gao, Beijing (CN); Jibing Dong, Beijing (CN); Jianbin Kang, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 204 days.

(21) Appl. No.: 16/356,364

(22) Filed: Mar. 18, 2019

(65) Prior Publication Data

US 2020/0026426 A1    Jan. 23, 2020

(30) Foreign Application Priority Data

Jul. 20, 2018   (CN) .......................... 201810801582.1

(51) Int. Cl.
*G06F 3/06*        (2006.01)

(52) U.S. Cl.
CPC ............ *G06F 3/0604* (2013.01); *G06F 3/067* (2013.01); *G06F 3/0655* (2013.01); *G06F 3/0689* (2013.01)

(58) Field of Classification Search
CPC ...... G06F 3/0604; G06F 3/061; G06F 3/0611; G06F 3/0619; G06F 3/0631; G06F 3/064; G06F 3/0649; G06F 3/0655; G06F 3/067; G06F 3/0685; G06F 3/0689
See application file for complete search history.

(56) References Cited

U.S. PATENT DOCUMENTS

| | | | |
|---|---|---|---|
| 8,443,445 B1 | 5/2013 | Andruss et al. | |
| 8,843,459 B1 * | 9/2014 | Aston | ..................... G06F 3/061 |
| | | | 711/162 |
| 9,389,965 B1 | 7/2016 | Douglis et al. | |
| 9,843,802 B1 | 12/2017 | Wallace et al. | |
| 10,372,477 B2 | 8/2019 | Liu et al. | |
| 10,733,019 B2 | 8/2020 | Cao et al. | |
| 10,884,781 B2 | 1/2021 | Liu et al. | |
| 2014/0122783 A1 * | 5/2014 | Oh | ........................ G06F 3/0647 |
| | | | 711/103 |
| 2018/0024867 A1 * | 1/2018 | Gilsdorf | ................ G06F 3/0655 |
| | | | 709/226 |
| 2018/0196755 A1 * | 7/2018 | Kusuno | ............... G06F 12/0246 |

* cited by examiner

*Primary Examiner* — Aracelis Ruiz
(74) *Attorney, Agent, or Firm* — BainwoodHuang

(57) ABSTRACT

Techniques manage a storage system. In such techniques, data types of data in multiple storage devices associated with the storage system are obtained. The multiple storage devices are divided into a first group of storage devices and a second group of storage devices according to the data types. A first processing ability of the first group of storage devices and a second processing ability of the second group of storage devices are determined separately. Data distribution is scheduled among the multiple storage devices on the basis of the first processing ability and the second processing ability. With such techniques, processing abilities of various storage devices in a resource pool may be balanced, so that workloads of various storage devices may be balanced and further overall response speed of the resource pool may be increased.

22 Claims, 10 Drawing Sheets

900

| | DISK 0 | DISK 1 | DISK 2 | DISK 3 | DISK 4 | DISK 5 | DISK 6 | DISK 7 | DISK 8 | DISK 9 |
|---|---|---|---|---|---|---|---|---|---|---|
| 0 | | | | | 25 | 13 | 19 | 70 | 55 | 82 |
| 1 | | SYSTEM DATA | | | 1 | 18 | 61 | 8 | 4 | 68 |
| 2 | | | | | 41 | 26 | 80 | 81 | 0 | 23 |
| 3 | | | | | 57 | 6 | 41 | 69 | 1 | 21 |
| 4 | 24 | 13 | 94 | 16 | 14 | 31 | 47 | 78 | 81 | 42 |
| 5 | 90 | 25 | 38 | 1 | 1 | 32 | 83 | 59 | 70 | 7 |
| 6 | 14 | 91 | 74 | 29 | 79 | 37 | 23 | 10 | 4 | 50 |
| 7 | 58 | 83 | 17 | 38 | 55 | 90 | 70 | 85 | 91 | 49 |
| 8 | 74 | 68 | 60 | 39 | 80 | 56 | 28 | 5 | 84 | 65 |
| 9 | 20 | 86 | 37 | 8 | 6 | 61 | 33 | 23 | 4 | 59 |
| 10 | 62 | 97 | 61 | 40 | 46 | 33 | 79 | 24 | 4 | 70 |
| 11 | 45 | 85 | 99 | 100 | 96 | 47 | 17 | 16 | 32 | 56 |
| 12 | 40 | 82 | 62 | 99 | 3 | 26 | 69 | 49 | 3 | 67 |
| 13 | 22 | 36 | 38 | 60 | 19 | 55 | 72 | 8 | 38 | 32 |
| 14 | 60 | 94 | 49 | 70 | 17 | 58 | 16 | 61 | 67 | 58 |
| 15 | 57 | 75 | 98 | 66 | 38 | 15 | 74 | 68 | 40 | 28 |
| 16 | 62 | 19 | 76 | 50 | 82 | 59 | 78 | 65 | 79 | 23 |
| 17 | 30 | 10 | 33 | 75 | 81 | 36 | 97 | 47 | 80 | 41 |
| 18 | 52 | 39 | 29 | 48 | 78 | 41 | 13 | 85 | 30 | 57 |
| 19 | 82 | 65 | 82 | 98 | 46 | 85 | 11 | 37 | 64 | 20 |
| 20 | | | | | | | | | | |
| WORKLOAD | 812 | 968 | 917 | 837 | 865 | 825 | 1011 | 951 | 831 | 918 |
| Δ | -9% | 8% | 3% | -6% | -3% | -8% | 13% | 6% | -7% | 3% |

FIG. 9

METHOD, APPARATUS AND COMPUTER PROGRAM PRODUCT FOR MANAGING STORAGE SYSTEM

CROSS-REFERENCE TO RELATED APPLICATION(S)

This application claims priority to Chinese Patent Application No. CN201810801582.1, on file at the China National Intellectual Property Administration (CNIPA), having a filing date of Jul. 20, 2018, and having "METHOD, APPARATUS, AND COMPUTER PROGRAM PRODUCT FOR MANAGING STORAGE SYSTEM" as a title, the contents and teachings of which are herein incorporated by reference in their entirety.

FIELD

Various implementations of the present disclosure generally relate to storage management, and more specifically, to a method, apparatus and computer program product for managing a storage system (e.g. Redundant Array of Independent Disks (RAID)).

BACKGROUND

With the development of data storage techniques, various data storage devices now provide users with increasingly high data storage capacity, and their data access speed has been improved greatly. With the increase of data storage capacity, users also impose greater demands on data reliability and response time of storage systems. So far a variety of data storage systems based on redundant arrays of disks have been developed to improve reliability of data. When one or more disks in a storage system fail(s), data in failed disk(s) can be recovered from other normal disk.

Mapped Redundant Array of Independent Disks (mapped RAID) has been developed so far. In the mapped RAID, a disk is a logical concept and may include multiple extents that may be distributed over different physical storage devices in a resource pool. Multiple extents included in one logical disk may be distributed over different physical storage devices in a resource pool. Regarding multiple extents in one stripe of the mapped RAID, they are supposed to be distributed over different physical storage devices, so that when a physical storage device where one extent among the multiple extents resides fails, a rebuild operation may be executed so as to recover data from a physical storage device where other extent resides.

It will be understood multiple storage devices in the resource pool may store different types of data. As a result, different storage devices have different processing capacities when processing user IO access. At this point, it is a tough technical issue regarding how to balance workloads between various storage devices in the resource pool and further increase the overall response speed of the resource pool.

SUMMARY

Therefore, it is desirable to develop and implement a technical solution for managing a storage system more effectively. It is desired that the technical solution can be compatible with existing storage systems and manage existing storage systems more effectively by reconstructing various configurations of these storage systems.

According to a first aspect of the present disclosure, there is provided a method for managing a storage system. The method includes: obtaining data types of data in multiple storage devices associated with the storage system; dividing the multiple storage devices into a first group of storage devices and a second group of storage devices according to the data types; determining a first processing ability of the first group of storage devices and a second processing ability of the second group of storage devices separately; and scheduling data distribution among the multiple storage devices on the basis of the first processing ability and the second processing ability.

According to a second aspect of the present disclosure, there is provided an apparatus for processing a computing task, including: at least one processor; a volatile memory; and a memory coupled to the at least one processor, the memory having instructions stored thereon, the instructions, when executed by the at least one processor, causing the apparatus to perform acts. The acts include: obtaining data types of data in multiple storage devices associated with the storage system; dividing the multiple storage devices into a first group of storage devices and a second group of storage devices according to the data types; determining a first processing ability of the first group of storage devices and a second processing ability of the second group of storage devices separately; and scheduling data distribution among the multiple storage devices on the basis of the first processing ability and the second processing ability.

According to a third aspect of the present disclosure, there is provided a computer program product. The computer program product is tangibly stored on a computer readable medium and includes machine executable instructions which, when executed, cause the machine to implement a method according to the first aspect.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings:

FIG. 9 schematically illustrates a block diagram for selecting a to-be-moved source extent from multiple storage devices according to example implementations of the present disclosure.

DETAILED DESCRIPTION

Figure 1A:
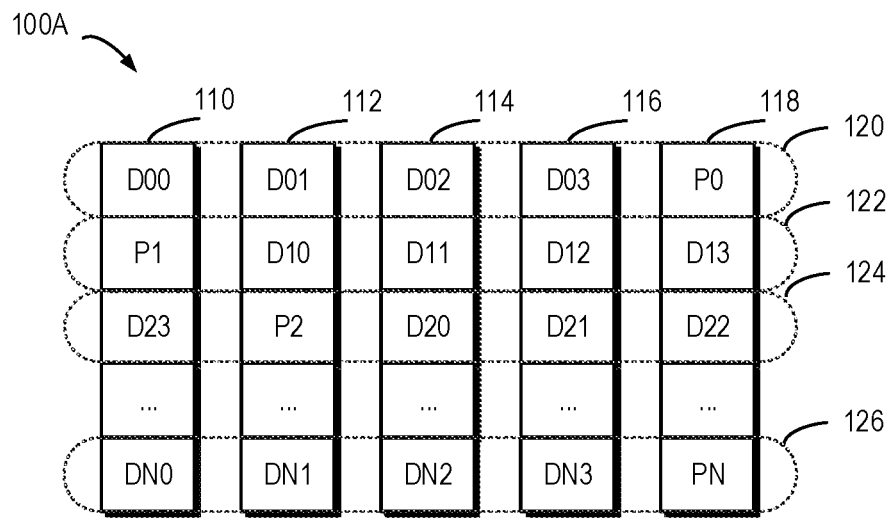
FIGS. 1A and 1B each illustrate a schematic view of a storage system in which a method of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

In the context of the present disclosure, the storage system may be a RAID-based storage system. The RAID-based storage system may combine multiple storage devices into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard RAID_levels and https://en.wikipedia.org/wikiNested_RAID_levels, etc.

FIG. 1A schematically illustrates a schematic view of a storage system 100A in which a method of the present disclosure may be implemented. In the storage system shown in FIG. 1A, working principles of RAID are illustrated by taking a RAID-5 (4D+1P, where 4D represents that 4 storage devices are included in the storage system for storing data, and 1P represents that 1 storage device is included in the storage system for storing parity) array that consists of five independent storage devices (110, 112, 114, 116 and 118) as an example. It should be noted although five storage devices are schematically shown in FIG. 1A, in other implementations more or less storage devices may be included according to different levels of RAID. Moreover, although FIG. 1A illustrates stripes 120, 122, 124, . . . 126, in other examples the RAID system may further include a different number of stripes.

In RAID, a stripe crosses multiple physical storage devices (for example, the stripe 120 crosses storage the devices 110, 112, 114, 116 and 118). The stripe may be simply construed as a storage area among multiple storage devices which satisfies a given address range. Data stored in the stripe 120 includes multiple parts: a data block D00 stored in the storage device 110, a data block D01 stored in the storage device 112, a data block D02 stored in the storage device 114, a data block D03 stored in the storage device 116, and a data block P0 stored in the storage device 118. In this example, the data blocks D00, D01, D02 and D03 are stored data, and the data block P0 is a P parity of the stored data.

The mode of storing data in other stripes 122 and 124 is similar to that in the stripe 120, and the difference is that the parity about other data block may be stored in other storage device than the storage device 118. In this way, when one of the multiple storage devices 110, 112, 114, 116 and 118 fails, data in the failed device may be recovered from other normal storage devices.

Figure 1B:
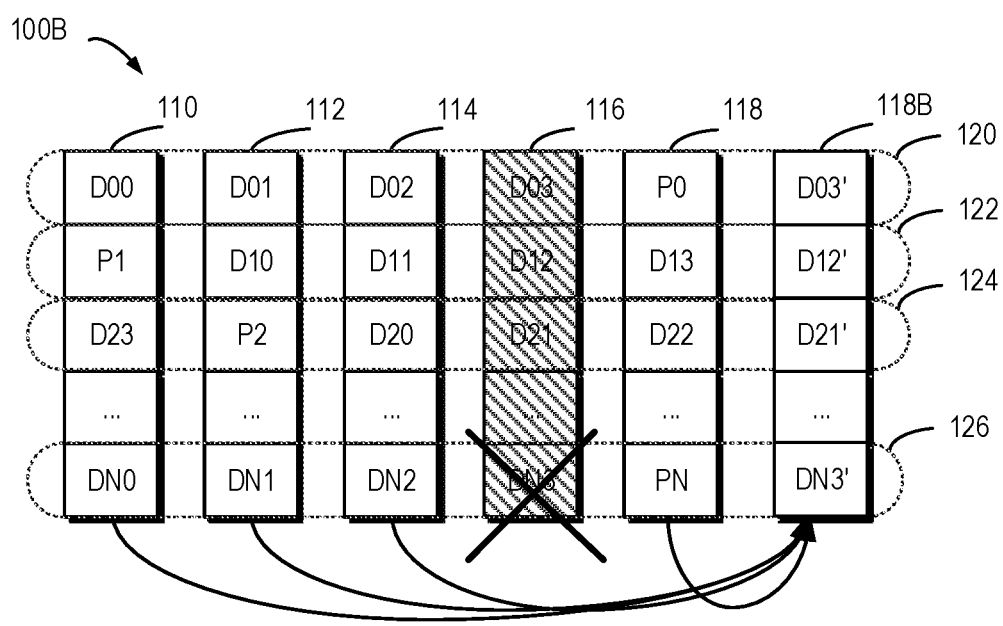

FIG. 1B schematically illustrates a schematic view 100B of rebuilding process of the storage system 100A. As shown in FIG. 1B, when one storage device (e.g. the shaded storage device 116) fails, data may be recovered from the other storage devices 110, 112, 114 and 118 that operate normally. At this point, a new backup storage device 118B may be added to RAID to replace the storage device 118. In this way, recovered data may be written to 118B, and system rebuilding may be realized.

Note while a RAID-5 storage system including 5 storage devices (among which 4 storage devices are used for storing data and 1 storage device is used for storing parity) has been described with reference to FIGS. 1A and 1B, according to definition of other RAID levels, there may further exist a storage system including a different number of storage devices. On the basis of definition of RAID-6, for example, two storage devices may be used to store parity P and Q respectively. For another example, according to definition of triple-parity RAID, three storage devices may be used to store parity P, Q and R respectively.

Figure 2:
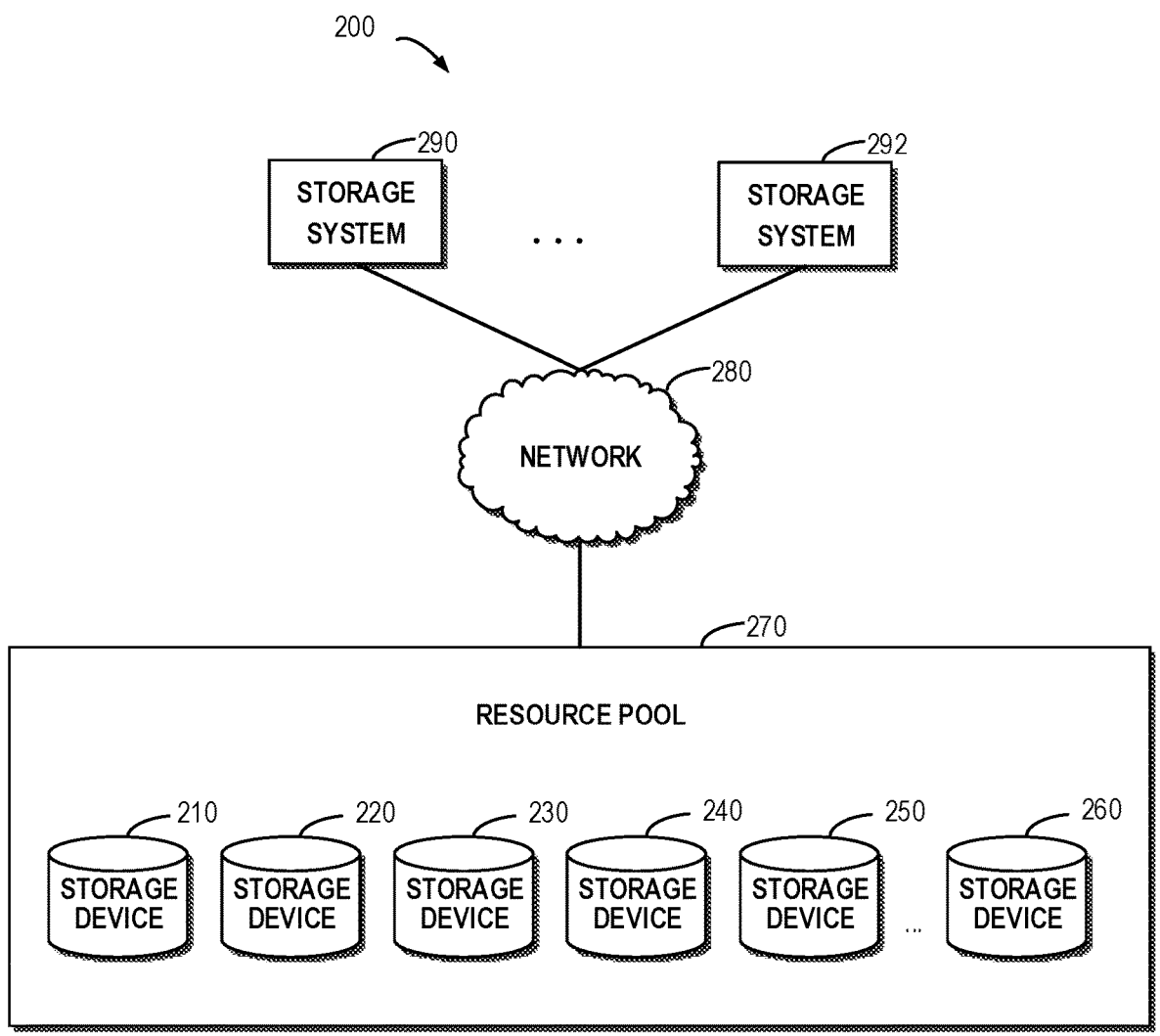
FIG. 2 schematically illustrates a block diagram of an example environment in which a method of the present disclosure may be implemented.

With the development of distributed storage technologies, the various storage devices 110, 112, 114, 116 and 118 in the storage system shown in FIGS. 1A and 1B may be no longer limited to physical storage devices but may be virtual storage devices. For example, respective extents on the storage device 110 may come from different physical storage devices (hereinafter referred to as storage devices for short) in the resource pool. FIG. 2 schematically shows a block diagram of an example environment in which the method of the present disclosure may be implemented. As depicted, a storage resource pool 270 may include multiple physical storage devices 210, 220, 230, 240, 250, . . . , 260. At this point, storage space in the multiple storage devices may be allocated to multiple storage systems 290, . . . , 292. At this point, these storage devices 290, . . . , 292 may access the storage space in the various storage devices in the storage resource pool 270 via a network 280.

Figure 3:
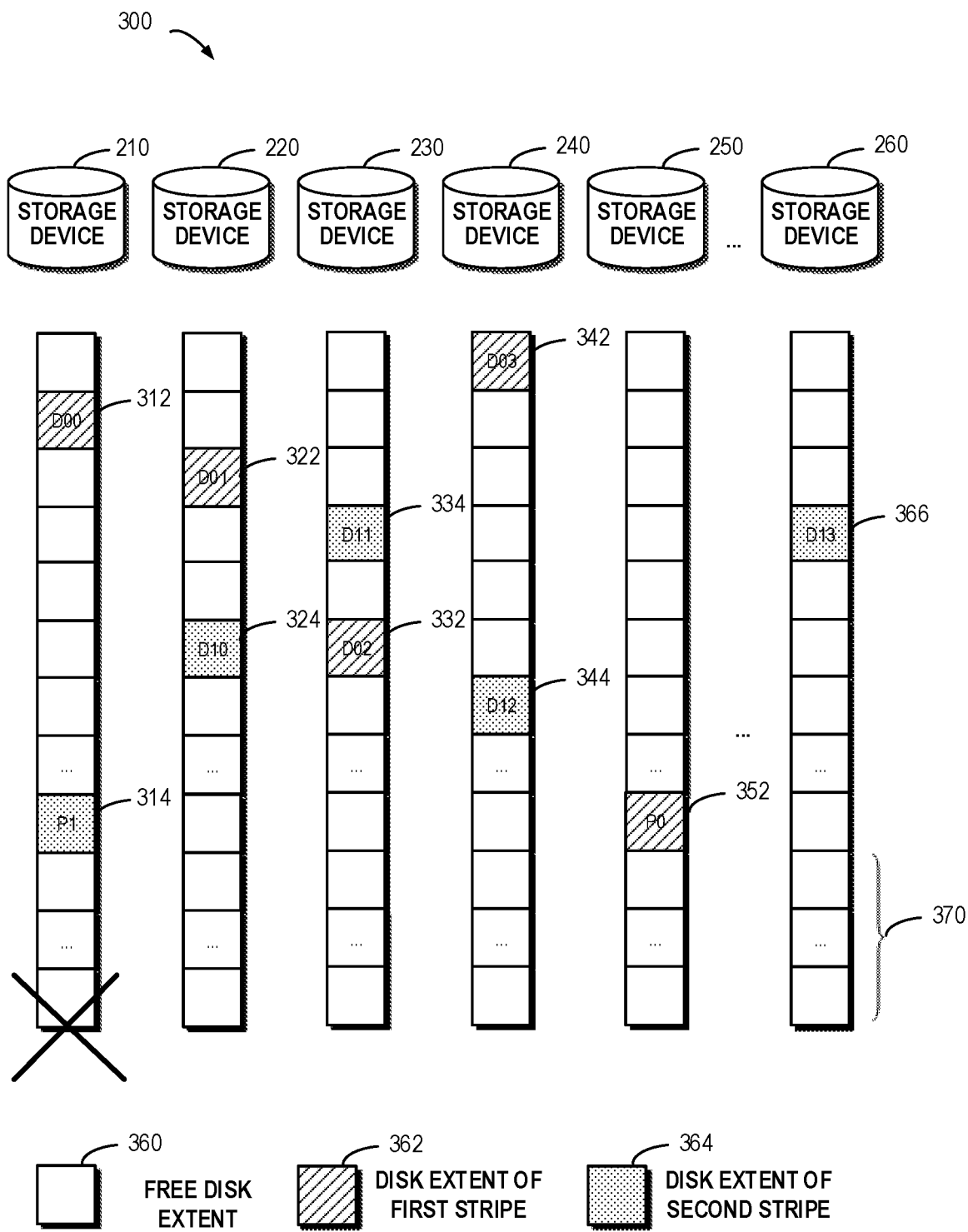
FIG. 3 schematically illustrates a diagram of a storage resource pool in FIG. 2.

FIG. 3 schematically shows a diagram of more information of the storage resource pool 270 as shown in FIG. 2. The resource pool 270 may include multiple storage devices 210, 220, 230, 240, 250, . . . , 260. Each storage device may include multiple extents, for example, a schematic view of extents included in each storage device is shown in the upper portion of the storage device. A blank extent (as shown by a legend 360) represents a free extent, an extent (as shown by a legend 362) shown with slashes represents an extent for a first stripe of the storage system 100A in FIG. 1, and an extent (as shown by a legend 364) shown in shades represents an extent for a second stripe of the storage system 100A in FIG. 1. At this point, extents 312, 322, 332, 342 and 352 for the first stripe are for storing data blocks D00, D01, D02, D03 and parity P0 of the first stripe respectively. Extents 324, 334, 344, 366 and 314 for the second stripe are for storing blocks D10, D11, D12, D13 and parity P1 of the second stripe respectively.

As shown in FIG. 3, there may exist a reserved free portion 370 in each storage device, so that when a storage device in the resource pool fails, extents in the free portion 370 in each storage device may be selected to rebuild various extents in the failed storage device.

Note in FIG. 3 the 4D+1P RAID-5 storage system is taken as an example to illustrate how extents in various stripes are distributed over multiple storage systems in the resource pool. When RAID based on other level is used, those skilled in the art may implement concrete details on the basis of the above described principles. For example, in the 6D+1P+1Q RAID-6 storage system, 8 extents in each stripe may be distributed over multiple storage devices so as to ensure a load balance between the multiple storage devices.

It will be understood different storage devices may have different processing capacities. Even if multiple storage devices with completely same configuration are adopted when building the resource pool 270, as extents on the multiple storage devices are allocated for storing different data, these storage devices will vary in ability to serve user I/O requests. Technical solutions have been proposed to evenly distribute storage spaces for user usage between multiple storage devices in the resource pool 270 and thereby ensure a load balance between the multiple storage devices. However, these technical solutions fail to consider the difference between processing capacities of various storage devices, thereby causing a big difference between loads of various storage devices in the resource pool 270.

Figure 4:
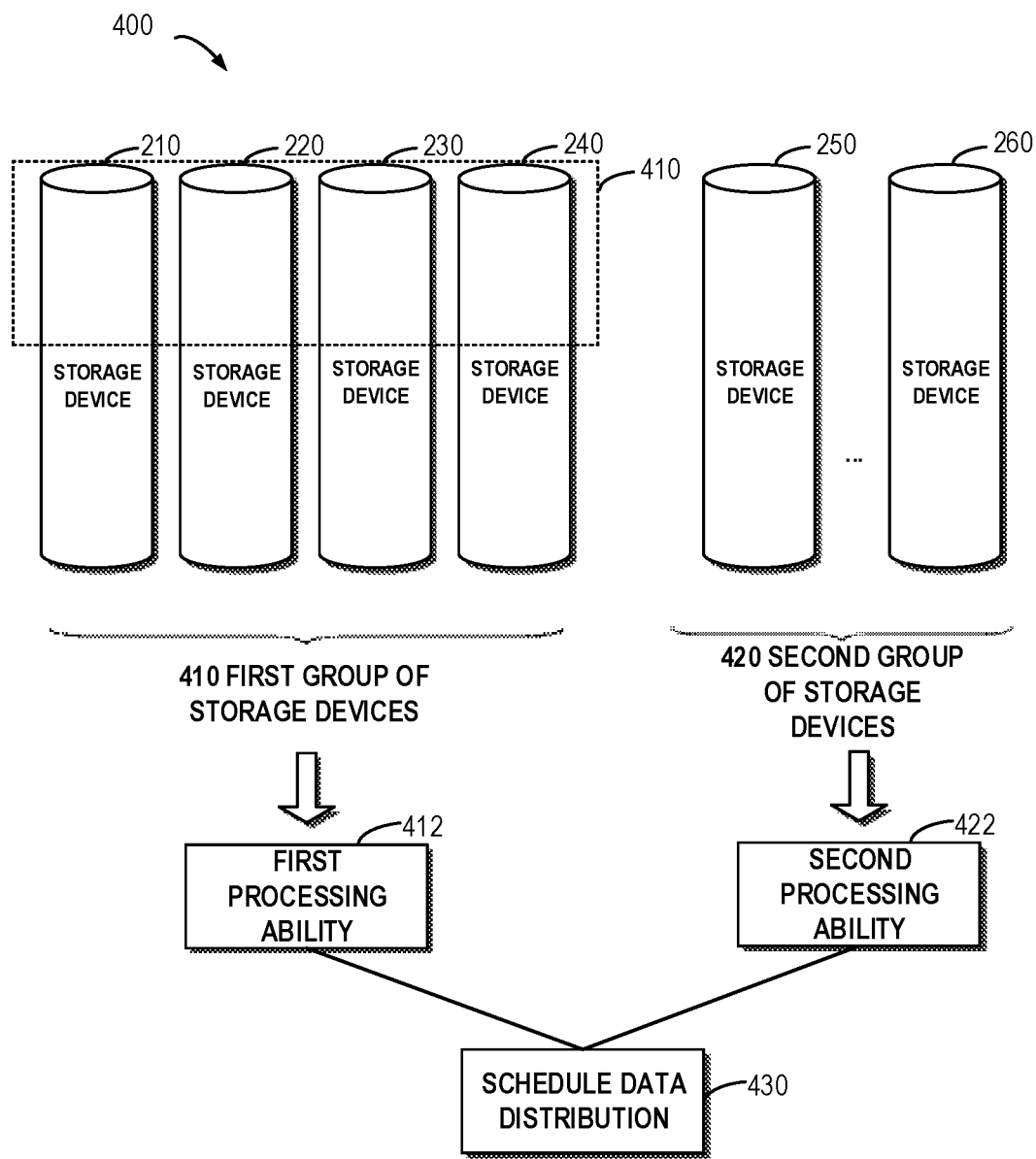
FIG. 4 schematically illustrates an architecture view for managing a storage system according to implementations of the present disclosure.

To solve the foregoing drawbacks, implementations of the present disclosure provide a method, apparatus and program product for managing a storage system. According to example implementations of the present disclosure, multiple storage devices may store different types of data. With reference to FIG. 4, specific implementations of the present disclosure will be described in detail. FIG. 4 schematically shows an architecture view 400 for managing a storage system according to implementations of the present disclosure. In this figure, a shaded area 410 represents a first type of data (e.g. data for managing operation of the storage system, called system data in short), and a blank portion represents a second type of data (e.g. data used by users of the storage system, called user data in short). In this example, storage devices 210 to 240 store both the first type and the second type of data, while storage devices 250, . . . , 260 store the second type of data.

At this point, the storage devices 210 to 260 in the resource pool 270 may be divided into a first group 410 of storage devices (consisting of the storage devices 210 to 240) and a second group 420 of storage devices (consisting of the storage devices 250, . . . , 260) according to the data type. It will be understood although FIG. 4 only shows four storage devices, i.e. 210 to 240 storing system data, in other implementation a different number of storage devices may be used to storage system data.

In this implementation, a first processing ability 412 of the first group 410 of storage devices and a second processing ability 422 of the second group 420 of storage devices may be determined separately. Here, the processing ability represents the ability of a corresponding storage device to serve I/O requests from users. Subsequently, data distribution may be scheduled (430) on the basis of the first processing ability 412 and the second processing ability 422. It will be understood that scheduling data distribution here means moving data among multiple storage devices. For example, as storage devices in different groups have different processing capacities, when a workload increase in one storage device among multiple storage devices is detected, extents of data on the storage device may be moved to a storage device with a lower workload, so as to achieve scheduling of data distribution. According to example implementations of the present disclosure, the workload increase may be determined through: for example, the increase of the number of access requests, the increase of data amount involved in the access request, the increase of response time, etc.

It will be understood data may be moved within the first group of storage devices, within the second group of storage devices, or between the first group of storage devices and the second group of storage devices (e.g. data are moved from the first group of storage devices to the second group of storage devices, or from the second group of storage devices to the first group of storage devices).

With the above example implementations, processing capacities of corresponding storage devices may be determined on the basis of the type of data stored in multiple storage devices in the resource pool 270, and further data distribution may be scheduled on the basis of the determined processing capacities. Thereby, workloads of various storage devices may be balanced more accurately. In this manner, response time of the storage system may be reduced, and further response speed of the whole storage system may be increased.

Figure 5:
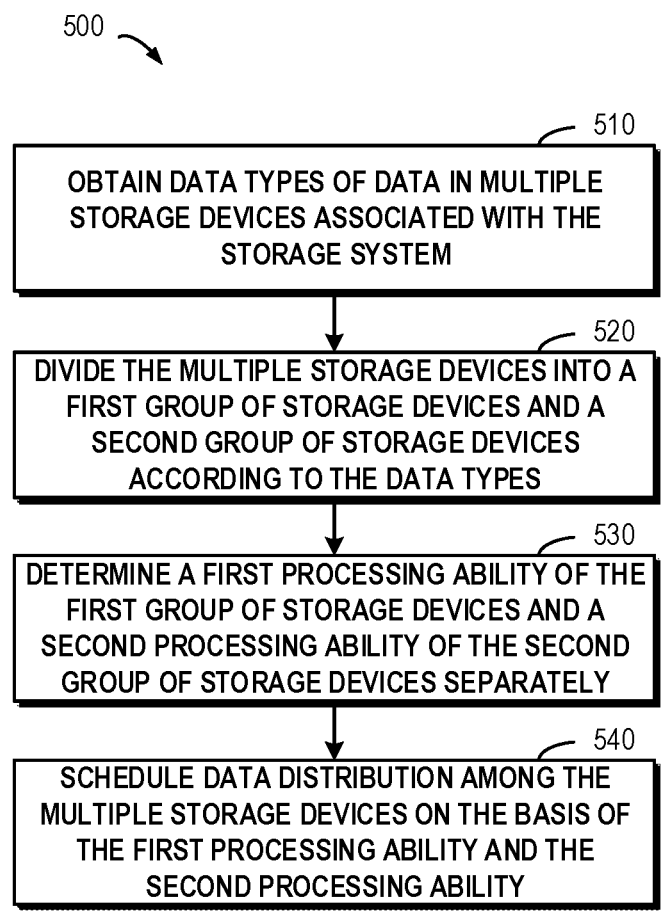
FIG. 5 schematically illustrates a flowchart of a method for managing a storage system according to implementations of the present disclosure.

With reference to FIG. 5, detailed description is presented below to more details on how to manage a storage system. FIG. 5 schematically shows a flowchart of a method 500 for managing a storage system according to implementations of the present disclosure. At block 510, data types of data in multiple storage devices associated with the storage system are obtained. Here the data types may include system data and user data. At block 520, the multiple storage devices are divided into a first group of storage devices and a second group of storage devices on the basis of the data types. Generally first several (e.g. first 4) storage devices in the resource pool 270 may be used to store the system data (the user data may be stored in remaining storage spaces on these storage devices), while the other storage devices in the resource pool 270 may be used to store the user data. At this point, the first 4 storage devices in the resource pool 270 may be used as the first group 410 of storage devices, while the other storage devices may be used as the second group 420 of storage devices.

At block 530, a first processing ability of the first group of storage devices and a second processing ability of the second group of storage devices may be determined separately. It will be understood since the system data are stored in the first group of storage devices, part of processing resources of various storage devices in the first group of storage devices will be used to process operations of the storage system and thus occupied. As a result, the processing ability of the first group of storage devices for serving I/O requests from users will be lower than that of the second group of storage devices. Therefore, at this point the first processing ability will be lower than the second processing ability.

It will be understood as types of stored data vary, storage devices in different groups may have different processing capacities. In this implementation, it may be measured more accurately from the processing ability of each storage device whether the workload of each storage device is saturated.

According to example implementations of the present disclosure, the processing ability may be measured in various manners. For example, regarding an existing storage device, its processing ability may be measured with a credit of the storage device. Here the credit represents the number of access requests which the storage device can simultaneously support. Therefore, the higher the credit, the stronger the processing ability of the storage device.

For example, suppose the first group of storage devices may simultaneously support 10 access requests, then the processing ability of the first group of storage devices may be set to 10. For another example, suppose the second group of storage devices may simultaneously support 50 access requests, then the processing ability of the second group of storage devices may be set to 50. It will be understood the values 10 and 50 here are merely schematic examples, and the processing ability of each group of storage devices may further be set to a different value as the configuration of the storage system varies.

According to example implementations of the present disclosure, the processing ability of a storage device may further be determined on the basis of the number of available resources in the storage device. For example, regarding the first group of storage devices, suppose most of resources are allocated for processing operations associated with the storage system and only 20% of resources can be used to process user I/O requests, then at this point the first processing ability may be set to 20%. For another example, regarding the second group of storage devices, suppose most of resources are allocated for processing user I/O requests, then at this point the second processing ability may be set to 90%. It will be understood the values 20% and 90% here are merely schematic examples, and the processing ability of each group of storage devices may further be set to a different value as the configuration of the storage system varies.

At block 540, data distribution may be scheduled among the multiple storage devices on the basis of the first processing ability and the second processing ability. Typically the second processing ability will be far higher than the first processing ability and even several times as large as the first processing ability. Therefore, when storing data to the storage system, the second group of storage devices may be utilized as much as possible, so that storage devices with a stronger processing ability may be used to serve users.

According to example implementations of the present disclosure, since the first-type system data cannot be moved, workloads of various storage devices may be balanced by moving the second-type user data according to processing capacities of different storage devices.

According to example implementations of the present disclosure, first respective workloads of the multiple storage devices may be determined. If it is determined a first workload of a first storage device among the multiple storage devices satisfies a predefined condition, then extents for second-type data on the first storage device may be moved to a second storage device. Here, the first workload is higher than a second workload of the second storage device.

With the foregoing example implementations, by taking into consideration workloads of various storage devices in the resource pool 270, frequently accessed extents on the first storage device with a higher workload may be moved to the second storage device with a lower workload. Through the movement, on the one hand the workload at the first storage device may be reduced, and further response speed of the first storage device. On the other hand, free storage device in the second storage device with a lower workload and faster response speed may be utilized as much as possible. In this manner, the overall response speed of various storage devices in the resource pool 270 may be increased.

According to example implementations of the present disclosure, an extent with a higher workload may further be selected from the first storage device. Specifically, a source extent may be selected from multiple extents included in the first storage device, the source extent having a heavier workload than a further extent among the multiple extents. The source extent is moved from the first storage device to a free extent on the second storage device. According to example implementations of the present disclosure, an extent with the heaviest workload may further be selected from the first storage device.

Figure 6:
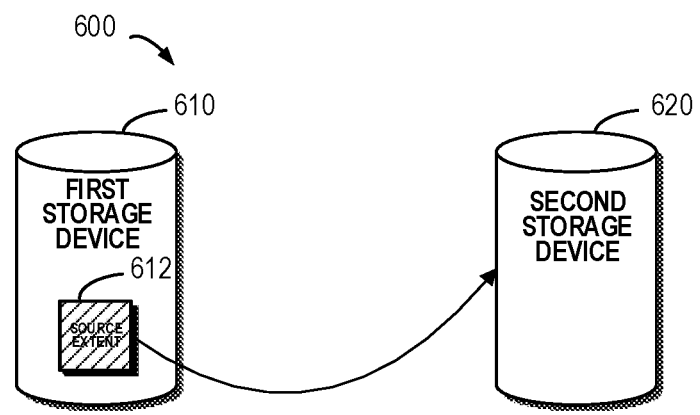
FIG. 6 schematically illustrates a block diagram for moving a source extent on a first storage device to a second storage device among multiple storage devices according to implementations of the present disclosure.

FIG. 6 schematically shows a block diagram 600 for moving a source extent on a first storage device to a second storage device among multiple storage devices according to implementations of the present disclosure. As depicted, a source extent 612 with the heaviest workload on a first storage device 610 may be determined by the above described method. At this point, data on the extent 612 may be copied to a free extent on a second storage device 620.

It will be understood if the first storage device 610 is under a heavy workload for a long time, then data thereon will be gradually moved to the second storage device 620 with a lighter workload. At this point, since the amount of stored data is reduced, the number of access requests received by the first storage device 610 will be reduced, and further concentrated access to the first storage device 610 might be alleviated. Although illustrated above is the example of moving the source extent 612 from the first storage device 610 to the second storage device 620, according to example implementations of the present disclosure, multiple first storage devices and multiple storage devices may co-exist, and move operations may be performed to multiple extents in parallel.

According to example implementations of the present disclosure, a workload of a given storage device may be obtained from any of the following aspects. For example, aspects may be considered as below: the number of data access requests for the given storage device, the data amount involved in access to the given storage device, and response time of the given storage device.

According to example implementations of the present disclosure, the workload may be determined on the basis of the number of requests for the storage device in a past period of time (e.g. 1 hour or other time interval). For example, suppose a storage device includes 16 extents, then a sum of counts of access to all of the 16 extents in the past one hour is calculated so as to determine a workload of the storage device. The higher the count of access, the heavier the workload.

According to example implementations of the present disclosure, the workload may be determined on the basis of the data amount involved in access to the given storage device within a past period of time (e.g. 1 hour or other time interval). The larger the data amount involved in access, the heavier the workload.

According to example implementations of the present disclosure, the workload may be determined on the basis of response time for access to the given storage device within a past period of time (e.g. 1 hour or other time interval). For example, an average value of response time for multiple access may be obtained. The larger the average value, the heavier the workload.

According to example implementations of the present disclosure, respective workloads of the multiple storage devices may be determined in a way below. For a given storage device among the multiple storage devices, a historical workload of the given storage device is obtained; the data type of data on the given storage device is determined; and according to the data type, the historical workload is corrected with the first processing ability and the second processing ability so as to obtain the workload. It will be understood since storage devices in different groups have different processing capacities, the same user I/O access request will lead to different workloads at different storage devices. Therefore, the collected historical workload needs to be corrected with processing capacities of various storage devices, so as to measure the impact of user I/O access requests on the storage device more accurately.

Figure 7:
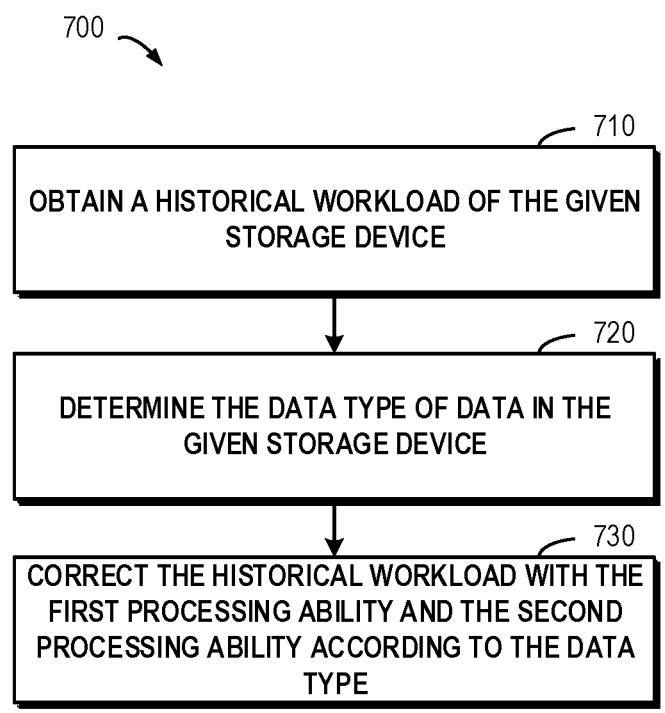
FIG. 7 schematically illustrates a flowchart of a method for determining a workload of a given storage device according to implementations of the present disclosure.

FIG. 7 schematically shows a flowchart of a method 700 for determining a workload of a given storage device according to implementations of the present disclosure. Operations to a given storage device in the resource pool 270 are as shown in FIG. 7. Here the given storage device may be a storage device selected from all or part of storage devices in the resource pool 270. In other words, the method 700 may be performed to all or part of storage devices in the resource pool 270, so as to select from the resource pool an appropriate storage device as a second storage device.

As depicted, at block 710, a historical workload of the given storage device is obtained. Subsequently at block 720, the type of data on the given storage device is determined. At block 730, the historical workload may be corrected with the first processing ability and the second processing ability according to the data type. Specifically, if it is found the given storage device stores system data, then the historical workload of a storage device in the first group of storage devices may be corrected on the basis of a ratio of the first processing ability to the second processing ability. Suppose the obtained historical storage device is denoted as Load, then a corrected value may be obtained from an equation below.

$$\text{Load}' = \text{Load} \times \frac{ProcessingAbility2}{ProcessingAbility1} \qquad \text{Equation 1}$$

In Equation 1, Load denotes the historical workload, ProcessingAbility1 and ProcessingAbility2 denote the first processing ability of the first group of storage devices and the second processing ability of the second group of storage devices respectively, and Load' denotes the corrected value of the historical workload. By means of this equation, the impact of user I/O requests on different storage devices may be measured more accurately. For example, continuing the above example, the first processing ability and the second processing ability are 10 and 50 respectively. Compared with a storage device in the second group of storage devices, the user I/O request on a storage device in the first group of storage devices may be 5 times as strong as an effect of the same user I/O request on a storage device in the second group of storage devices.

According to example implementations of the present disclosure, the historical workload of the storage device may be determined on the basis of various methods. For example, calculation may be based on Equation 2.

$$\text{Load} = Load_0 \times e^{-\alpha \times \Delta t} + \frac{\Delta H \times (1 - e^{-\alpha \times \Delta t})}{\alpha \times \Delta t} \qquad \text{Equation 2}$$

In Equation 2, Load denotes a historical workload, $Load_0$ denotes a historical workload determined in a previous period of time, $\alpha$ denotes a decay factor which may be derived from a workload exponential half-life decay period, $\Delta H$ denotes I/O activity in a current period of time, and $\Delta t$ denotes an interval between two sampling times. It will be understood Equation 2 is merely illustrative, and according to example implementations of the present disclosure, other equation may further be used to determine the historical workload.

Figure 8:
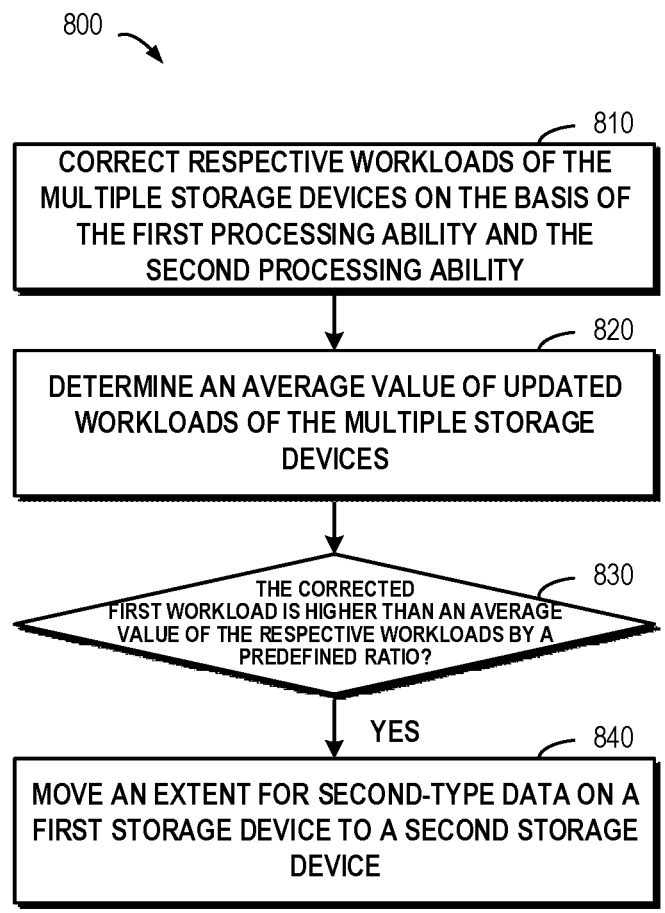
FIG. 8 schematically illustrates a flowchart of a method for moving a source extent on a first storage device to a second storage device according to implementations of the present disclosure.

FIG. 8 schematically shows a flowchart of a method 800 for moving a source extent on a first storage device to a second storage device according to implementations of the present disclosure. At block 810, respective workloads of the multiple storage devices may be determined on the basis of the first processing ability and the second processing ability first. For example, regarding a storage device in the first group of storage devices, its workload may be updated according to Equation 1. For a storage device in the second group of storage devices, its workload may be determined in a traditional way. At block 820, an average value may be determined according to corrected workloads. At block 830, if it is found a first workload of the first storage device is a predefined ratio higher than the average value, then the operational flow proceeds to block 840. At block 840, an extent for the second type of data on the first storage device may be moved to the second storage device with a lighter workload than the first storage device.

By means of the above example implementations, extents with heavier workloads on the first storage device may be determined. Then, an extent with the heaviest workload is used as a source extent, and the source extent is moved from the first storage device to other storage device with a lighter workload. In this manner, the workload at the first storage device may be reduced significantly. Further, response time of the first storage device may be reduced, and response speed of the whole storage system may be increased.

According to example implementations of the present disclosure, workloads may further be determined in a traditional way (e.g. according to Equation 2), and then both the first and second processing abilities are considered when determining whether the workload of the first storage device satisfies a predefined condition. Specifically, the first workload and the second workload are corrected on the basis of the first processing ability and the second processing ability respectively; it is determined the first workload of the first storage device satisfies a predefined condition in response to the corrected first workload is higher than the corrected second workload. In this implementation, the correction operation may be implemented when comparing the workloads of the two storage device. For example, the above Equation 1 may be used for the correction operation.

According to example implementations of the present disclosure, respective workloads of the multiple storage devices are corrected on the basis of the first processing ability and the second processing ability; and a first workload of a first storage device is determined to satisfy a predefined condition in response to determining that the corrected first workload is higher than an average value of the respective workloads by a predefined ratio. In this implementation, an average value of workloads of the multiple storage devices may be determined, and a subsequent move operation is performed when the first workload is higher than the average value by 10%. According to example implementations of the present disclosure, the average value may be determined from Equation 3 below.

$$Load_{avg} = \sum_{i=1}^{m} Load_i \times \frac{ProcessingAbility2}{ProcessingAbility1} + \sum_{j=m+1}^{n} Load_j \quad \text{Equation 3}$$

In Equation 3, $Load_i$ denotes a workload of a storage device in the first group of storage devices, m denotes the number of storage devices included in the first group, ProcessingAbility1 and ProcessingAbility2 denote the first processing ability of the first group of storage devices and the second processing ability of the second group of storage devices respectively, n denotes the number of the multiple storage devices, and $Load_j$ denotes a workload of a storage device in the second group of storage devices.

FIG. 9 schematically shows a block diagram 900 for selecting a to-be-moved source extent from multiple storage devices according to example implementations of the present disclosure. As depicted, suppose the multiple storage devices in the resource pool 270 are denoted as disk 0 to disk 9 respectively, and each disk includes 20 extents. Among the multiple storage devices, the $0^{th}$ extent to the $3^{rd}$ extent on each of disk 0 to disk 3 store system data, while the remaining extents store user data. All extents on disk 4 to disk 9 store user data.

In a table as shown in FIG. 9, a figure in a cell on the table denotes a corrected workload of a corresponding extent as determined according to the above described method (i.e. the workload of each extent is denoted by a count of access). For example, the workload of the $4^{th}$ extent on disk 0 is 24, and the workload of the $5^{th}$ extent on disk 1 is 25. "Workload" below the table denotes a count of access to a whole disk (i.e. a sum of counts of access to various extents on the disk), and "Δ" denotes a difference between a count of access to a corresponding disk and an average count of access to the multiple disks.

As seen from data shown in FIG. 9, the count of access to disk 6 is 1011, and its difference with the average value is 13% (higher than a predefined threshold 10%). The $17^{th}$ extent on disk 6 has the highest count of access and thus may be moved to other disk with a lighter workload (e.g. disk 0). It will be understood although shown in FIG. 9 is the example where only one free extent (the $20^{th}$ extent) exists on each disk, in other implementations various disks may contain various numbers of extents.

According to example implementations of the present disclosure, the storage system is a RAID-based storage system. In order to ensure the moved extent still supports the RAID storage system, first multiple extents included in a stripe associated with the source extent may be determined. Then, the second storage device may be selected from the multiple storage devices other than corresponding storage devices where the multiple extents reside. It will be understood in the RAID-based storage system, it should be ensured various extents of one stripe reside on different storage devices. Therefore, it is ensured the selected second storage device differs from storage devices where other extents of the stripe reside.

While examples of the method according to the present disclosure have been described in detail with reference to FIGS. 2 to 9, description is presented below to the implementation of a corresponding apparatus. According to example implementations of the present disclosure, provided is an apparatus for managing a storage system. The apparatus includes: an obtaining module configured to obtain data types of data in multiple storage devices associated with the storage system; a dividing module configured to divide the multiple storage devices into a first group of storage devices and a second group of storage devices according to the data types; a determining module configured to determine a first processing ability of the first group of storage devices and a second processing ability of the second group of storage devices separately; and a scheduling module configured to schedule data distribution among the multiple storage devices on the basis of the first processing ability and the second processing ability. The apparatus here may be configured to execute various steps of the above described method 500, which is not detailed.

Figure 10:
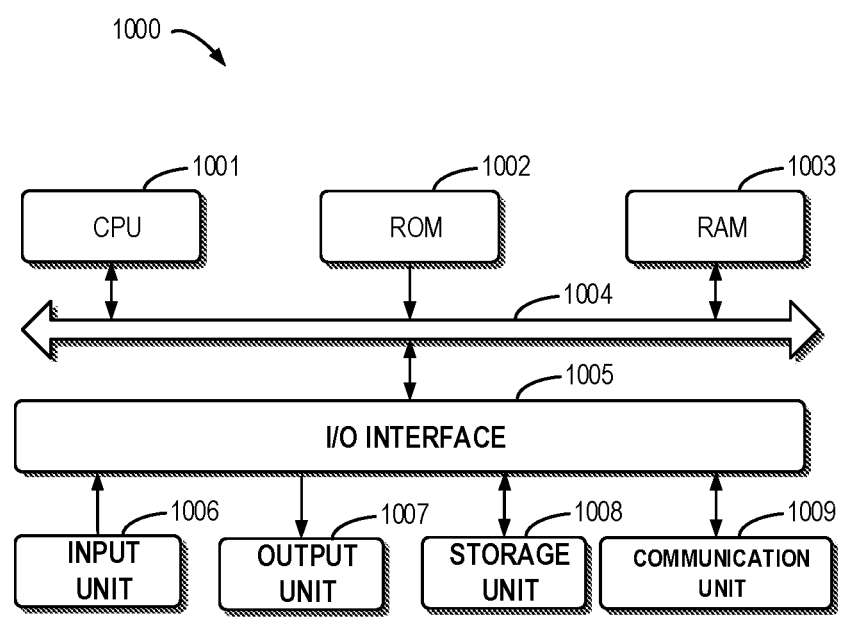
FIG. 10 schematically illustrates a block diagram of an apparatus for managing a storage system according to example implementations of the present disclosure.

FIG. 10 schematically shows a block diagram of an apparatus 1000 for managing a storage system according to example implementations of the present disclosure. As depicted, the apparatus 1000 includes a central process unit (CPU) 1001, which can execute various suitable actions and processing based on the computer program instructions stored in the read-only memory (ROM) 1002 or computer program instructions loaded in the random-access memory (RAM) 1003 from a storage unit 1008. The RAM 1003 can also store all kinds of programs and data required by the operations of the apparatus 1000. CPU 1001, ROM 1002 and RAM 1003 are connected to each other via a bus 1004. The input/output (I/O) interface 1005 is also connected to the bus 1004.

A plurality of components in the apparatus 1000 is connected to the I/O interface 1005, including: an input unit 1006, such as keyboard, mouse and the like; an output unit 1007, e.g., various kinds of display and loudspeakers etc.; a storage unit 1008, such as magnetic disk and optical disk etc.; and a communication unit 1009, such as network card, modem, wireless transceiver and the like. The communication unit 1009 allows the apparatus 1000 to exchange information/data with other devices via the computer network, such as Internet, and/or various telecommunication networks.

The above described each process and treatment, such as the method 500, can also be executed by the processing unit 1001. For example, in some implementations, the method 500 can be implemented as a computer software program tangibly included in the machine-readable medium, e.g., the storage unit 1008. In some implementations, the computer program can be partially or fully loaded and/or mounted to the apparatus 1000 via ROM 1002 and/or the communication unit 1009. When the computer program is loaded to the RAM 1003 and executed by the CPU 1001, one or more steps of the above described method 500 can be implemented. Alternatively, in other implementations, the CPU 1001 also can be configured in other suitable manners to realize the above procedure/method.

According to example implementations of the present disclosure, there is provided an apparatus for managing a storage system, the apparatus including: at least one processor; a volatile memory; and a memory coupled to the at least one processor, the memory having instructions stored thereon, the instructions, when executed by the at least one processor, causing the apparatus to perform acts. The acts include: obtaining data types of data in multiple storage devices associated with the storage system; dividing the multiple storage devices into a first group of storage devices and a second group of storage devices according to the data types; determining a first processing ability of the first group of storage devices and a second processing ability of the second group of storage devices separately; and scheduling data distribution among the multiple storage devices on the basis of the first processing ability and the second processing ability.

According to example implementations of the present disclosure, the data types include a first type of data for managing operations of the storage system and a second type of data to be used by users of the storage system; and the first group of storage devices stores data of both the first type and the second type, and the second group of storage devices stores data of the second type.

According to example implementations of the present disclosure, scheduling data distribution among the multiple storage devices includes: moving data of the second type between the multiple storage devices.

According to example implementations of the present disclosure, moving data of the second type includes: determining respective workloads of the multiple storage devices; and moving an extent for second-type data on a first storage device to a second storage device in response to determining a first workload of the first storage device among the multiple storage devices satisfies a predefined condition, the first workload being heavier than a second workload of the second storage device.

According to example implementations of the present disclosure, determining respective workloads of the multiple storage devices includes: for a given storage device among the multiple storage devices, obtaining a historical workload of the given storage device; determining the data type of data in the given storage device; and correcting the historical workload with the first processing ability and the second processing ability according to the data type.

According to example implementations of the present disclosure, obtaining a historical workload of the given storage device includes: determining the historical workload of the given storage device on the basis of at least one of: the number of data access requests for the given storage device, the data amount involved in access to the given storage device, and response time of the given storage device.

According to example implementations of the present disclosure, determining a first workload of a first storage device among the multiple storage devices satisfies a predefined condition includes: correcting the first workload and the second workload on the basis of the first processing ability and the second processing ability respectively; and determining a first workload of a first storage device satisfies a predefined condition in response to determining the corrected first workload is heavier than the corrected second workload.

According to example implementations of the present disclosure, determining a first workload of a first storage device among the multiple storage devices satisfies a predefined condition includes: correcting respective workloads of the multiple storage devices on the basis of the first processing ability and the second processing ability; and determining a first workload of a first storage device satisfies a predefined condition in response to determining the corrected first workload is a predefined ratio higher than an average value of the respective workloads.

According to example implementations of the present disclosure, moving an extent for second-type data on the first storage device to the second storage device includes: selecting a source extent from multiple extents included in the first storage device, the source extent having a heavier workload than a further extent among the multiple extents; and moving the source extent from the first storage device to a free extent on the second storage device.

According to example implementations of the present disclosure, the storage system is a Redundant Array of Independent Disks. The acts further include: determining multiple extents included in a stripe associated with the source extent; and selecting the second storage device from the multiple storage devices other than corresponding storage devices where the multiple extents reside.

According to example implementations of the present disclosure, there is provided a computer program product. The computer program product is tangibly stored on a computer readable medium and includes machine executable instructions which, when executed, cause a machine to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcode, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:

1. A method for managing a storage system, the method comprising:
    obtaining data types of data in multiple storage devices associated with the storage system;
    dividing the multiple storage devices into a first group of storage devices and a second group of storage devices according to the data types, the data types comprising a first type of data for managing operations of the storage system and a second type of data to be used by users of the storage system;
    storing at least the first type of data in the first group of storage devices;
    storing the second type of data in the second group of storage devices;
    determining a first processing ability of the first group of storage devices based on at least the first type of data being stored in the first group of storage devices; and
    determining a second processing ability of the second group of storage devices based on the second type of data being stored in the second group of storage devices, each of the first processing ability and the second processing ability representing a respective processing ability to serve data access requests from users; and
    scheduling data distribution among the multiple storage devices on the basis of the first processing ability and the second processing ability.

2. The method of claim 1, wherein:
the first group of storage devices stores data of both the first type and the second type.

3. The method of claim 2, wherein scheduling data distribution among the multiple storage devices comprises:
moving data of the second type between the multiple storage devices.

4. The method of claim 3, wherein moving data of the second type comprises:
determining respective workloads of the multiple storage devices; and
moving an extent for second-type data on a first storage device to a second storage device in response to determining a first workload of the first storage device among the multiple storage devices satisfies a predefined condition, the first workload being heavier than a second workload of the second storage device.

5. The method of claim 4, wherein determining a first workload of a first storage device among the multiple storage devices satisfies a predefined condition comprises:
correcting the first workload and the second workload on the basis of the first processing ability and the second processing ability respectively; and
determining a first workload of a first storage device satisfies a predefined condition in response to determining the corrected first workload is heavier than the corrected second workload.

6. The method of claim 4, wherein determining a first workload of a first storage device among the multiple storage devices satisfies a predefined condition comprises:
correcting respective workloads of the multiple storage devices on the basis of the first processing ability and the second processing ability; and
determining a first workload of a first storage device satisfies a predefined condition in response to determining the corrected first workload is higher than an average value of the respective workloads by a predefined ratio.

7. The method of claim 4, wherein moving an extent for second-type data on the first storage device to the second storage device comprises:
selecting a source extent from multiple extents comprised in the first storage device, the source extent having a heavier workload than a further extent among the multiple extents; and
moving the source extent from the first storage device to a free extent on the second storage device.

8. The method of claim 7, wherein the storage system is a Redundant Array of Independent Disks, and the method further comprises:
determining multiple extents comprised in a stripe associated with the source extent; and
selecting the second storage device from the multiple storage devices other than corresponding storage devices where the multiple extents reside.

9. The method of claim 4, wherein determining respective workloads of the multiple storage devices comprises: for a given storage device among the multiple storage devices,
obtaining a historical workload of the given storage device;
determining a data type of data in the given storage device; and
correcting the historical workload with the first processing ability and the second processing ability according to the data type.

10. The method of claim 9, wherein obtaining a historical workload of the given storage device comprises:
determining the historical workload of the given storage device on the basis of at least one of: a number of data access requests for the given storage device, the data amount involved in access to the given storage device, and response time of the given storage device.

11. The method of claim 1, wherein the first type of data corresponds to system data, wherein the second type of data corresponds to user data, wherein storing at least the first type of data in the first group of storage devices includes storing at least the system data in the first group of storage devices, and wherein storing the second type of data in the second group of storage devices includes storing the user data in the second group of storage devices.

12. An apparatus for managing a storage system, comprising:
at least one processor;
a volatile memory; and
a memory coupled to the at least one processor and having instructions stored thereon, the instructions, when executed by the at least one processor, causing the apparatus to perform acts comprising:
obtaining data types of data in multiple storage devices associated with the storage system;
dividing the multiple storage devices into a first group of storage devices and a second group of storage devices according to the data types, the data types comprising a first type of data for managing operations of the storage system and a second type of data to be used by users of the storage system;
storing at least the first type of data in the first group of storage devices;
storing the second type of data in the second group of storage devices;
determining a first processing ability of the first group of storage devices based on at least the first type of data being stored in the first group of storage devices; and
determining a second processing ability of the second group of storage devices based on the second type of data being stored in the second group of storage devices, each of the first processing ability and the second processing ability representing a respective processing ability to serve data access requests from users; and
scheduling data distribution among the multiple storage devices on the basis of the first processing ability and the second processing ability.

13. The apparatus of claim 12, wherein,
the first group of storage devices stores data of both the first type and the second type.

14. The apparatus of claim 13, wherein scheduling data distribution among the multiple storage devices comprises:
moving data of the second type between the multiple storage devices.

15. The apparatus of claim 14, wherein moving data of the second type comprises:
determining respective workloads of the multiple storage devices; and
moving an extent for second-type data on a first storage device to a second storage device in response to determining a first workload of the first storage device among the multiple storage devices satisfies a predefined condition, the first workload being heavier than a second workload of the second storage device.

16. The apparatus of claim 15, wherein determining a first workload of a first storage device among the multiple storage devices satisfies a predefined condition comprises:
   correcting the first workload and the second workload on the basis of the first processing ability and the second processing ability respectively; and
   determining a first workload of a first storage device satisfies a predefined condition in response to determining the corrected first workload is heavier than the corrected second workload.

17. The apparatus of claim 15, wherein determining a first workload of a first storage device among the multiple storage devices satisfies a predefined condition comprises:
   correcting respective workloads of the multiple storage devices on the basis of the first processing ability and the second processing ability; and
   determining a first workload of a first storage device satisfies a predefined condition in response to determining the corrected first workload is higher than an average value of the respective workloads by a predefined ratio.

18. The apparatus of claim 15, wherein moving an extent for second-type data on the first storage device to the second storage device comprises:
   selecting a source extent from multiple extents comprised in the first storage device, the source extent having a heavier workload than a further extent among the multiple extents; and
   moving the source extent from the first storage device to a free extent on the second storage device.

19. The apparatus of claim 18, wherein the storage system is a Redundant Array of Independent Disks, and the acts further comprise:
   determining multiple extents comprised in a stripe associated with the source extent; and
   selecting the second storage device from the multiple storage devices other than corresponding storage devices where the multiple extents reside.

20. The apparatus of claim 14, wherein determining respective workloads of the multiple storage devices comprises: for a given storage device among the multiple storage devices,
   obtaining a historical workload of the given storage device;
   determining a data type of data in the given storage device; and
   correcting the historical workload with the first processing ability and the second processing ability according to the data type.

21. The apparatus of claim 20, wherein obtaining a historical workload of the given storage device comprises:
   determining the historical workload of the given storage device on the basis of at least one of: a number of data access requests for the given storage device, the data amount involved in access to the given storage device, and response time of the given storage device.

22. A computer program product having a non-transitory computer readable medium which stores a set of instructions to manage a storage system; the set of instructions, when carried out by computerized circuitry, causing the computerized circuitry to perform a method of:
   obtaining data types of data in multiple storage devices associated with the storage system;
   dividing the multiple storage devices into a first group of storage devices and a second group of storage devices according to the data types, the data types comprising a first type of data for managing operations of the storage system and a second type of data to be used by users of the storage system;
   storing at least the first type of data in the first group of storage devices;
   storing the second type of data in the second group of storage devices;
   determining a first processing ability of the first group of storage devices based on at least the first type of data being stored in the first group of storage devices; and
   determining a second processing ability of the second group of storage devices based on the second type of data being stored in the second group of storage devices, each of the first processing ability and the second processing ability representing a respective processing ability to serve data access requests from users; and
   scheduling data distribution among the multiple storage devices on the basis of the first processing ability and the second processing ability.

* * * * *